US012753698B1

(12) United States Patent
Ghigliotty Rosado et al.

(10) Patent No.: US 12,753,698 B1
(45) Date of Patent: Oct. 6, 2026

(54) TURBINE ENGINE VANE BAFFLE

(71) Applicant: RTX Corporation, Farmington, CT (US)

(72) Inventors: Jaime G. Ghigliotty Rosado, Cabo Rojo, PR (US); Dominic J. Mongillo, Jr., West Hartford, CT (US); Russell J. Bergman, South Windsor, CT (US); Scott A Kovach, Higganum, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/190,540

(22) Filed: Apr. 25, 2025

(51) Int. Cl.
*F01D 5/18* (2006.01)
*F01D 9/04* (2006.01)

(52) U.S. Cl.
CPC ............ *F01D 5/187* (2013.01); *F01D 9/041* (2013.01); *F05D 2250/184* (2013.01); *F05D 2260/2212* (2013.01); *F05D 2260/22141* (2013.01)

(58) Field of Classification Search
CPC .... F01D 5/187; F01D 9/041; F05D 2250/184; F05D 2260/2212; F05D 2260/22141
See application file for complete search history.

(56) References Cited

U.S. PATENT DOCUMENTS 3,767,322 A * 10/1973 Durgin .................... F01D 5/189 415/115
5,511,937 A * 4/1996 Papageorgiou ......... F01D 5/189 415/115
5,704,763 A 1/1998 Lee
6,530,745 B2 3/2003 Ciani
8,182,203 B2 * 5/2012 Hada ....................... F01D 5/189 415/115
9,611,745 B1 * 4/2017 Jones ...................... F01D 9/065
10,436,037 B2 10/2019 Jones
11,230,931 B1 * 1/2022 Dvorozniak ............ F01D 5/189
11,280,201 B2 * 3/2022 Generale ................. F01D 9/065
11,428,166 B2 * 8/2022 Stafford ..................... F02C 7/12
2008/0260537 A1 * 10/2008 Lang ....................... F01D 5/189 416/96 R
2016/0194978 A1 * 7/2016 Memmen ................ F01D 25/12 415/115

(Continued)

OTHER PUBLICATIONS

EP Search Report for EP Patent Application No. 26160781.6 dated May 27, 2026.

*Primary Examiner* — Andrew J Marien
(74) *Attorney, Agent, or Firm* — Getz Balich LLC

(57) ABSTRACT

A turbine vane is provided that includes inner and outer radial platforms, an airfoil, and a baffle. The airfoil extends radially between the platforms. The airfoil extends spanwise between a base end and a tip end. The airfoil includes opposing suction and pressure sidewalls, and an interior wall that extends laterally between the suction and pressure sidewalls. The pressure sidewall, the suction sidewall, and the interior wall define an interior cavity. The baffle is disposed in the interior cavity. The baffle includes a forward wall segment, a suction sidewall segment, a pressure sidewall segment, and a fin segment. The forward wall segment, the suction sidewall segment, and the pressure sidewall segment collectively define an interior chamber of the baffle. The fin segment extends outwardly from the interior chamber, and the fin segment has a wavy configuration.

20 Claims, 16 Drawing Sheets

(56) References Cited

U.S. PATENT DOCUMENTS

| | | | |
|---|---|---|---|
| 2017/0030202 | A1 | 2/2017 | Itzel |
| 2017/0122112 | A1 | 5/2017 | Davis |
| 2020/0182072 | A1 | 6/2020 | Spangler |
| 2021/0108519 | A1 | 4/2021 | Generale |
| 2022/0003121 | A1 | 1/2022 | Dvorozniak |

* cited by examiner

TURBINE ENGINE VANE BAFFLE

GOVERNMENT LICENSE RIGHTS

This invention was made with Government support under Contract N00019-21-G-0005; Order No. N00019-23-F-0019 awarded by the United States Navy. The Government has certain rights in this invention.

BACKGROUND OF THE DISCLOSURE

1. Technical Field

This disclosure relates generally to a turbine engine and, more particularly, to a turbine vane structure for the turbine engine.

2. Background Information

A gas turbine engine such as a turbofan engine may include multiple vane structures within its turbine section. Various types and configurations of turbine section vane structures are known in the art. While these known turbine section vane structures have various benefits, there is still room in the art for improvement.

SUMMARY OF THE DISCLOSURE

According to an aspect of the present disclosure, a turbine vane is provided that includes an outer radial platform, an inner platform, an airfoil, and a baffle. The airfoil extends radially between the inner and outer radial platforms. The airfoil extends spanwise between a base end and a tip end, and extends chordwise between a leading edge and a trailing edge. The airfoil includes a suction sidewall and a pressure sidewall laterally opposite the suction sidewall, and an interior wall that extends laterally between the suction sidewall and the pressure sidewall. The pressure sidewall, the suction sidewall, and the interior wall define an interior cavity. The baffle is disposed in the interior cavity. The baffle includes a forward wall segment, a suction sidewall segment, a pressure sidewall segment, and a fin segment. The forward wall segment, the suction sidewall segment, and the pressure sidewall segment collectively define an interior chamber of the baffle. The fin segment extends outwardly from the interior chamber, and the fin segment has a wavy configuration.

In any of the aspects or embodiments described herein, the suction sidewall segment and the pressure sidewall segment may be engaged with one another at a point of engagement and the fin segment may extend outwardly from the point of engagement.

In any of the aspects or embodiments described herein, the forward wall segment and the pressure sidewall segment may be integral with one another, and the suction sidewall segment and the fin segment may be integral with one another, and the forward wall segment may be attached to the suction sidewall segment, and the pressure sidewall segment may be attached to the suction sidewall segment at the point of engagement.

In any of the aspects or embodiments described herein, the forward wall segment may be disposed at a forward end of the baffle and the fin segment may be disposed at an aft end of the baffle, and the wavy configuration of the fin segment may include a plurality of waves that each extend along a wave axis that extends in an aft direction.

In any of the aspects or embodiments described herein, the wave axis of one or more waves may have an axial orientation.

In any of the aspects or embodiments described herein, the wave axis of one or more waves may be disposed at a radially outward angle.

In any of the aspects or embodiments described herein, the wave axis of one or more waves may be disposed at a radially inward angle.

In any of the aspects or embodiments described herein, the wavy configuration of the fin segment may have at least one wave that extends along a wave axis that extends parallel to the point of engagement.

In any of the aspects or embodiments described herein, the baffle may extend lengthwise between an inner radial edge and an outer radial edge, and the fin segment may extend in a direction between the inner and outer radial edges.

In any of the aspects or embodiments described herein, the fin segment may have a width that is uniform between the inner and outer radial edges.

In any of the aspects or embodiments described herein, the fin segment may extend from the inner radial edge to the outer radial edge, and the fin segment may have a first width at the inner radial edge and a second width at the outer radial edge. The first width may be greater than the second width, or the second width may be greater than the first width.

In any of the aspects or embodiments described herein, the wavy configuration may be periodic and may have an amplitude and a frequency.

In any of the aspects or embodiments described herein, the wavy configuration may include a first wavy portion that is periodic and has a first amplitude and a first frequency, and may include a second wavy portion that is periodic and has a second amplitude and a second frequency, and the first amplitude may be greater than the second amplitude, or the first frequency may be lower than the second frequency, or any combination thereof.

According to an aspect of the present disclosure, a gas turbine engine is provided that includes a compressor section, a combustor section, and a turbine section. The turbine section includes an annular vane stage having a plurality of vanes that collectively form the annular vane stage. The turbine section includes at least one rotor stage rotatable about a central axis. Each vane includes an outer radial platform, an inner radial platform, an airfoil, and a baffle. The airfoil extends radially between the inner and outer radial platforms. The airfoil extends spanwise between a base end and a tip end, and extends chordwise between a leading edge and a trailing edge. The airfoil includes a suction sidewall and a pressure sidewall laterally opposite the suction sidewall, and an interior wall that extends laterally between the suction sidewall and the pressure sidewall. The pressure sidewall, the suction sidewall, and the interior wall define an interior cavity. The baffle is disposed in the interior cavity. The baffle includes a forward wall segment, a suction sidewall segment, a pressure sidewall segment, and a fin segment. The forward wall segment, the suction sidewall segment, and the pressure sidewall segment collectively define an interior chamber of the baffle. The fin segment extends outwardly from the interior chamber, and the fin segment has a wavy configuration.

In any of the aspects or embodiments described herein, each vane may be configured to receive a flow of cooling air at the outer radial platform and direct the flow of cooling air through the vane. The wavy configuration of the fin segment may be configured to produce turbulence within the flow of cooling air.

In any of the aspects or embodiments described herein, the forward wall segment may be disposed at a forward end of the baffle and the fin segment may be disposed at an aft end of the baffle, and the wavy configuration of the fin segment may include a plurality of waves that each extend along a wave axis that extends parallel to the central axis.

In any of the aspects or embodiments described herein, the forward wall segment may be disposed at a forward end of the baffle and the fin segment may be disposed at an aft end of the baffle, and the wavy configuration of the fin segment may include a plurality of waves that each extend along a wave axis that extends at an acute angle relative to the central axis.

In any of the aspects or embodiments described herein, the suction sidewall segment and the pressure sidewall segment may be engaged with one another at a point of engagement and the fin segment may extend outwardly from the point of engagement, and the wavy configuration of the fin segment may have at least one wave that extends along a wave axis that extends parallel to the point of engagement.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
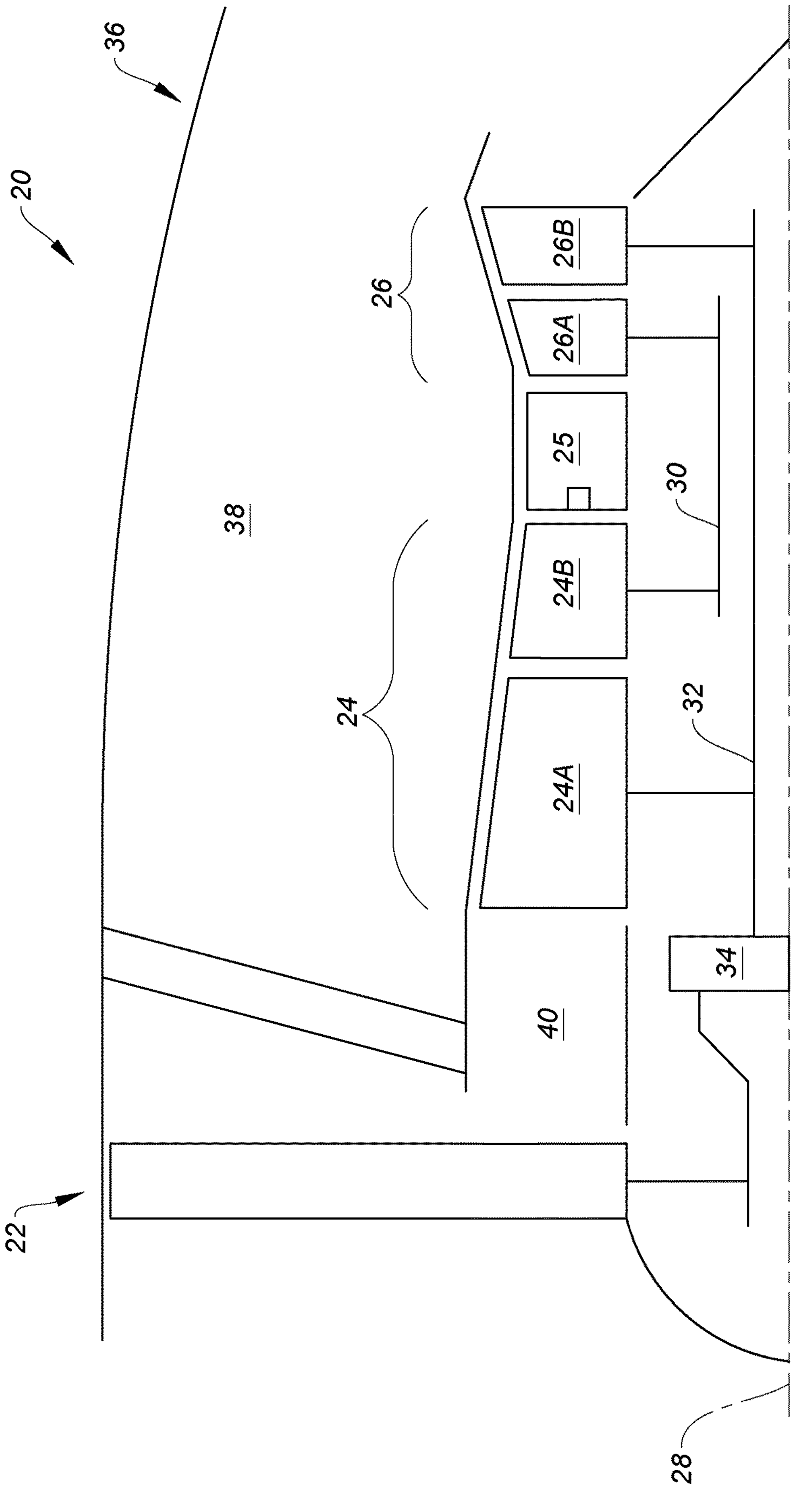
FIG. 1 is a diagrammatic view of an aircraft powerplant.

FIG. 1 illustrates a gas turbine engine 20 that may be used as a propulsion system for an aircraft. The aircraft may be an airplane, a drone (e.g., an unmanned aerial vehicle (UAV)) or any other manned or unmanned aerial vehicle or system. The gas turbine engine 20 diagrammatically shown in FIG. 1 is configured as a turbofan. The present disclosure is not limited to use with a turbofan type gas turbine engine; e.g., the engine 20 may be configured as a turbojet, a turboprop, a turboshaft, a propfan, a pusher fan, or any other type of ducted or open rotor propulsion system. Moreover, the present disclosure is not limited to aircraft propulsion system applications; e.g., the present disclosure may be used in power generating applications.

The gas turbine engine 20 includes a fan section 22, a compressor section 24, a combustor section 25, and a turbine section 26. In this example engine 20, the fan section 22, the compressor section 24, and the turbine section 26 rotate about a central axis 28. The compressor section 24 includes a low pressure compressor section (LPC section 24A) and a high pressure compressor section (HPC section 24B). The turbine section 26 includes a high pressure turbine section (HPT section 26A) and a low pressure turbine section (LPT section 26B). A high speed shaft 30 connects the HPC section 24B and the HPT section 26A. The high speed shaft 30 is rotatable about the central axis 28. A low speed shaft 32 connects the LPC section 24A and the LPT section 26B. The fan section 22 may be directly engaged with the low speed shaft 32 or may be indirectly engaged with the low speed shaft 32 via a geared arrangement 34.

In FIG. 1, the gas turbine engine 20 is shown disposed within a nacelle structure 36 that forms a bypass flow path 38 disposed radially outside of the gas turbine engine core.

During operation, ambient air is drawn into the engine 20 through the fan section 22. A portion of the air enters a core gas flow path 40 and a portion of the air enters the bypass flow path 38. The core gas flow path 40 extends sequentially through the LPC section 24A, the HPC section 24B, the combustor section 25, the HPT section 26A, and the LPT section 26B. The air entering the core gas flow path 40 may be referred to as “core gas”. The air within the bypass flow path 38 may be referred to as “bypass air”.

While the gas turbine engine 20 is described above with a two shaft/spool configuration, the present disclosure is not limited thereto.

Figure 2:
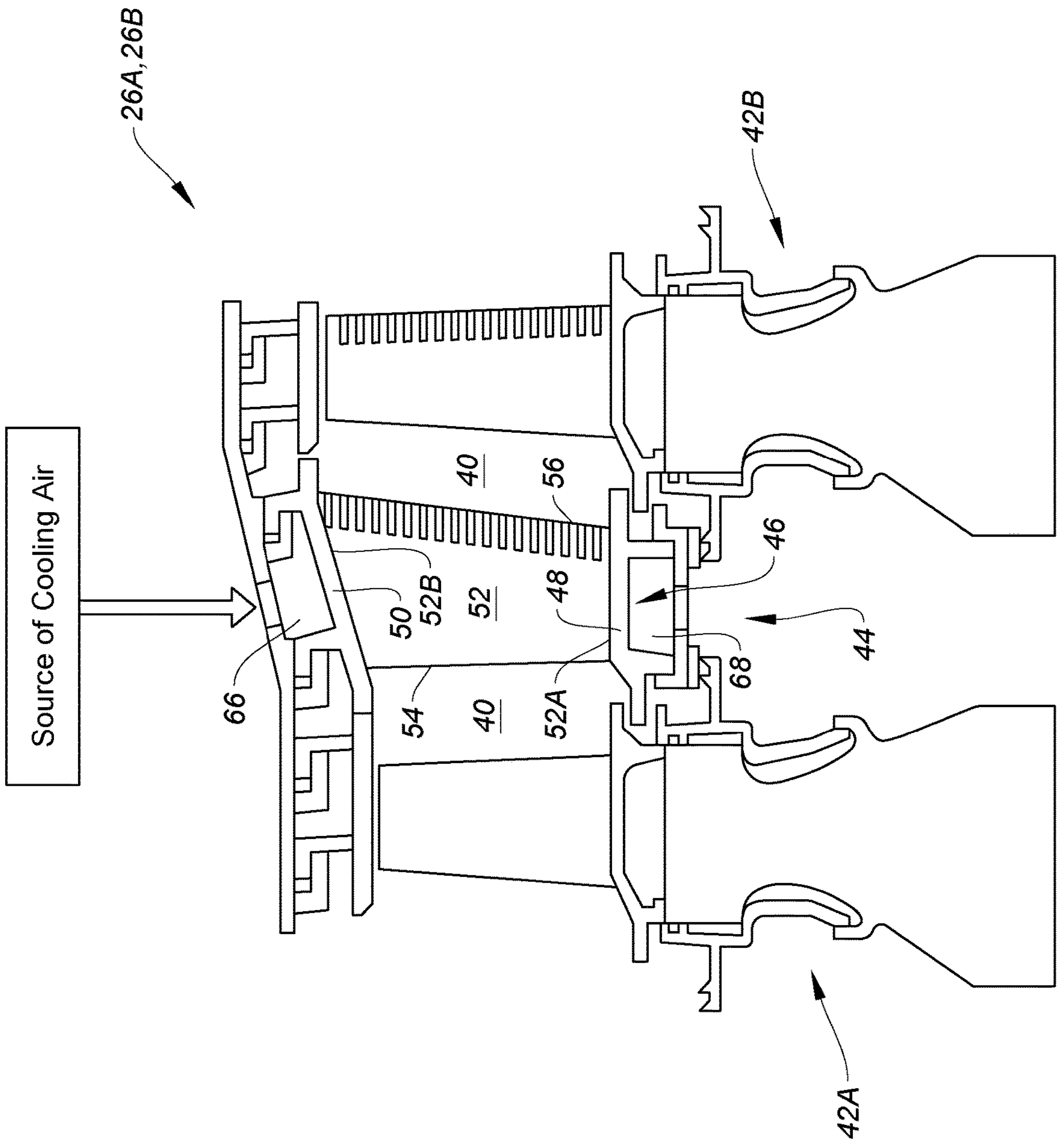
FIG. 2 is a diagrammatic view of a turbine section engine assembly.

FIG. 2 illustrates a portion of a turbine section 26 (e.g., the HPT section 26A or the LPT section 26B) that includes a first rotor stage 42A, a vane stage 44, and a second rotor stage 42B. In this view, the vane stage 44 is disposed axially between the first and second rotor stages 42A, 42B. The vane stage 44 is an annular structure that includes a plurality of stator vanes 46 that collectively form the annular vane stage 44. Each vane 46 includes an inner radial platform 48, an outer radial platform 50, and one or more airfoils 52 that extend between the inner and outer radial platforms 48, 50. To facilitate the description herein, the vane 46 will be described as having a single airfoil 52 but the present disclosure is not limited thereto.

Figure 3:
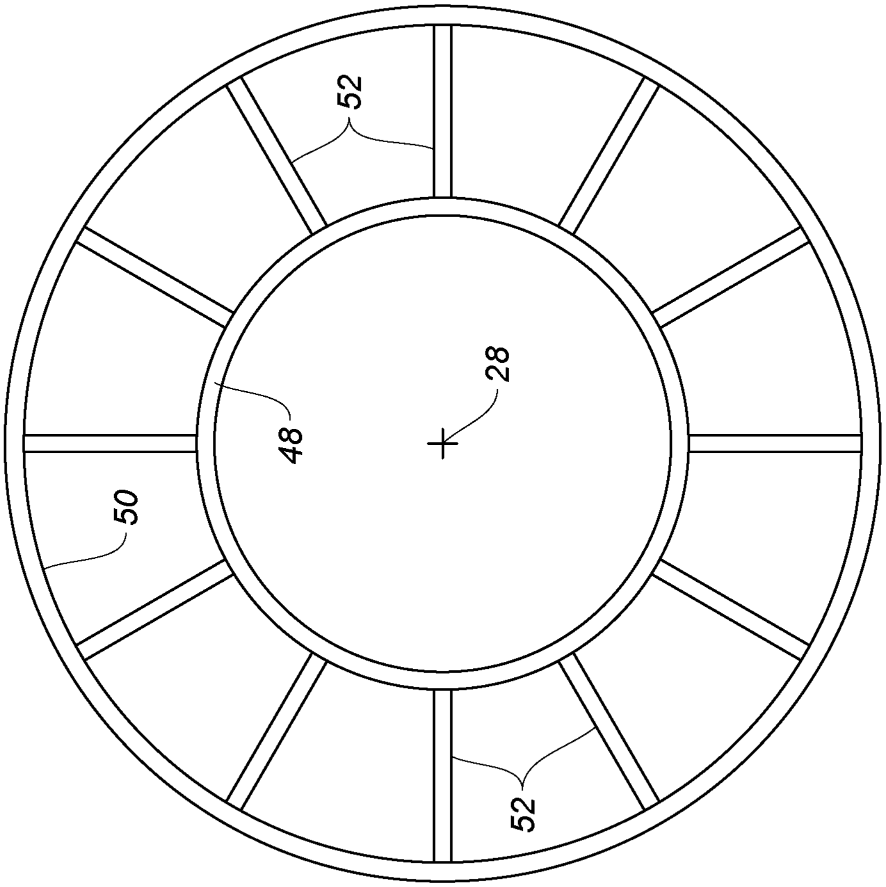
FIG. 3 is a diagrammatic end view of a turbine vane structure.

Referring to FIG. 3, the inner radial platforms 48 of the vanes 46 within the vane stage 44 collectively form an annular structure that defines the inner radial flow boundary through the vane stage 44. The outer radial platforms 50 of the vanes 46 within the vane stage 44 collectively form an annular structure that defines the outer radial flow boundary through the vane stage 44.

Figure 4:
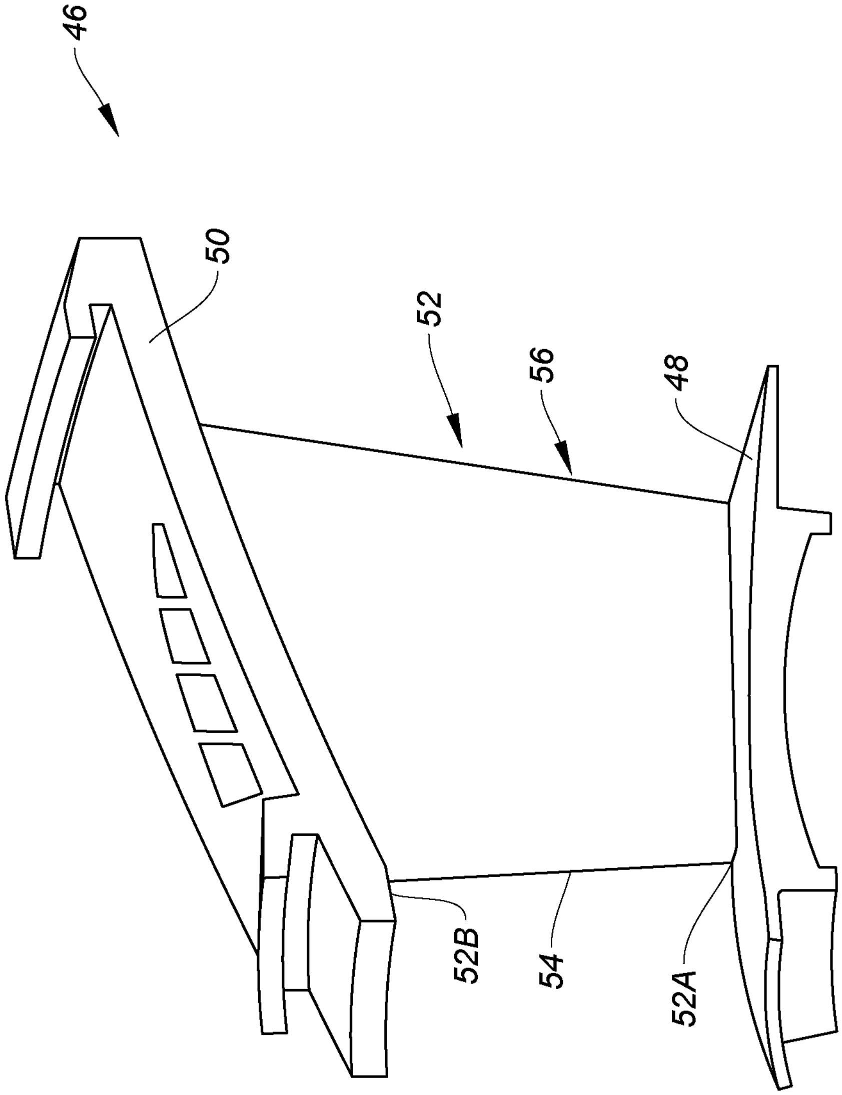
FIG. 4 is a diagrammatic view of a turbine vane structure embodiment.
Figure 5:
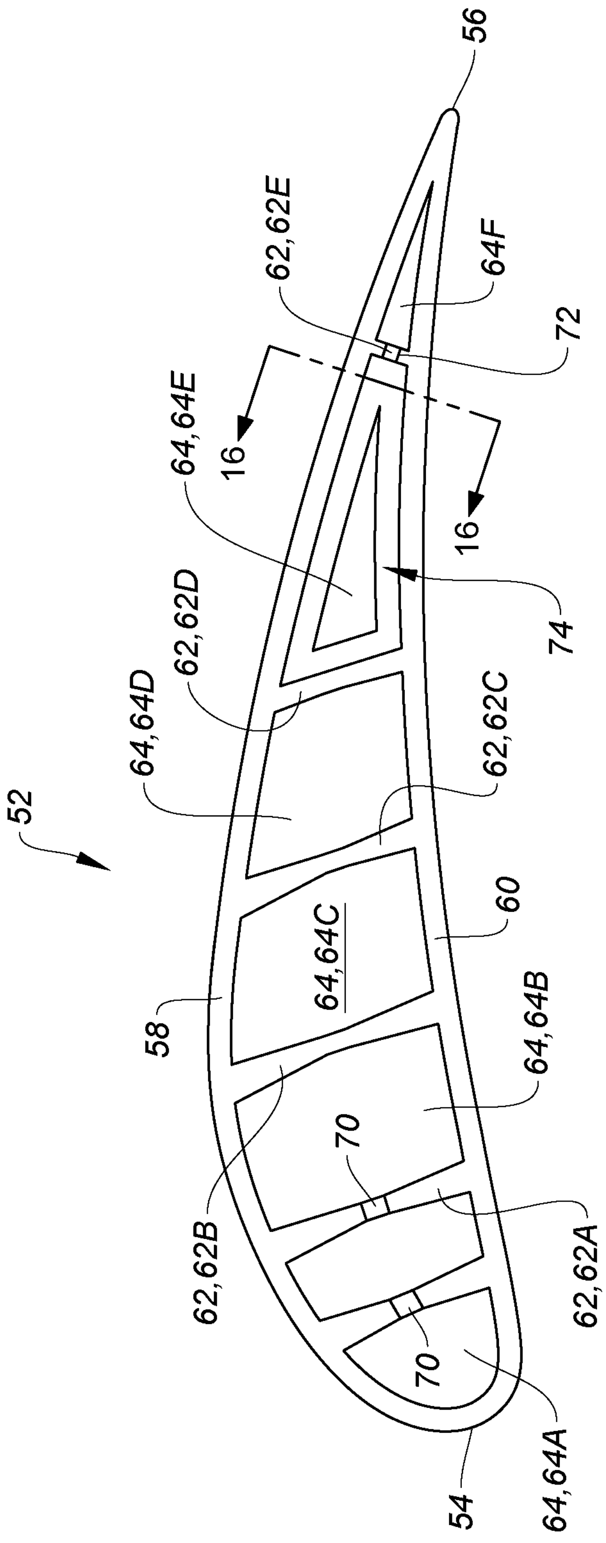
FIG. 5 is a diagrammatic sectional view of a turbine vane airfoil.

FIG. 4 diagrammatically illustrates a turbine vane 46 that includes an airfoil 52, an outer radial platform 50, and an inner radial platform 48. The airfoil 52 extends spanwise from a base end 52A to a tip end 52B. The base end 52A is contiguous with the inner radial platform 48 and the tip end 52B is contiguous with the outer radial platform 50. The airfoil 52 is connected to the inner radial platform 48 and the outer radial platform 50. The airfoil 52 extends chordwise between a leading edge 54 and a trailing edge 56. FIG. 5 is a diagrammatic cross-sectional view of a vane airfoil 52. The airfoil 52 extends between opposing lateral sides; e.g., a suction side and a pressure side. The suction side and the pressure side extend chordwise between the leading edge 54 and the trailing edge 56, and spanwise between the base end 52A and the tip end 52B.

Figure 6:
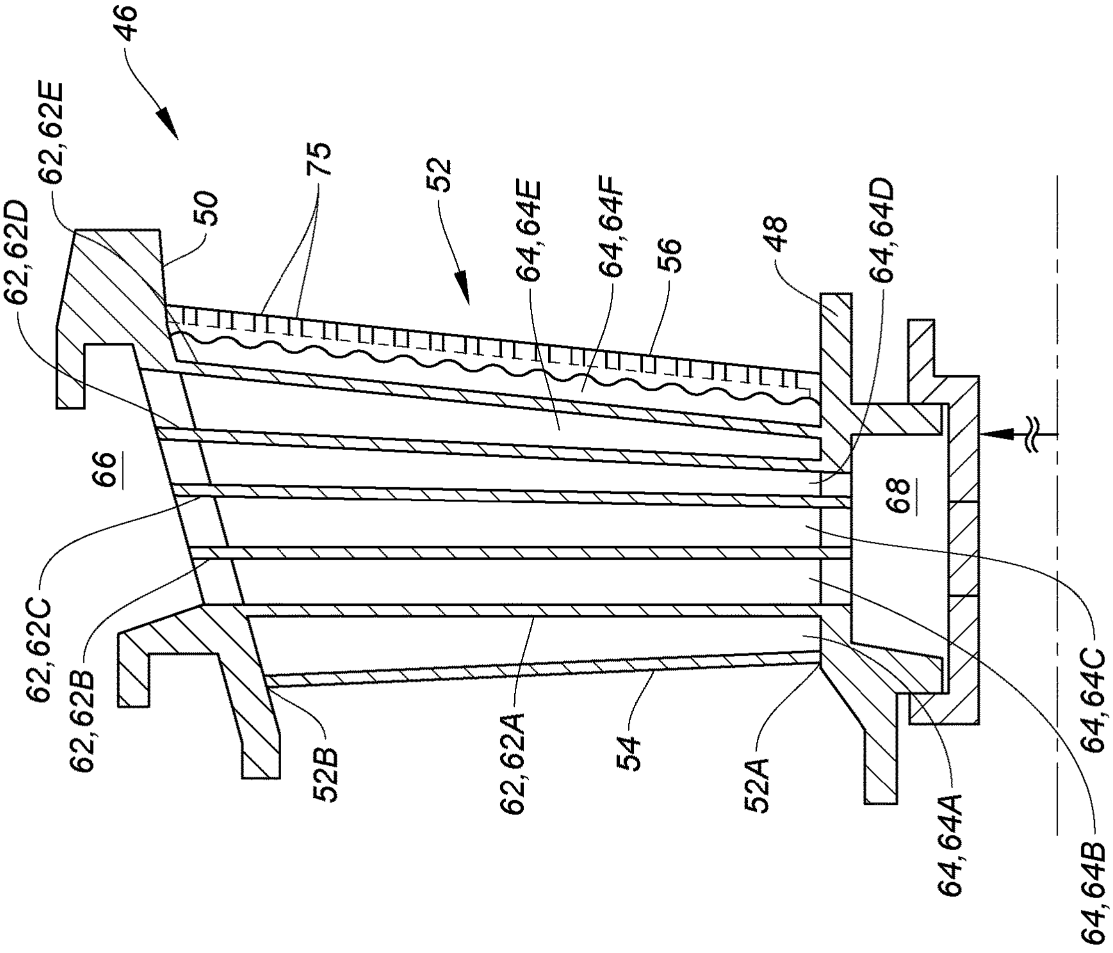
FIG. 6 is a diagrammatic sectioned view of a turbine vane structure embodiment.

Referring to FIG. 5, the airfoil 52 includes a suction sidewall 58, a pressure sidewall 60, and one or more interior walls 62 that extend internally between the suction sidewall 58 and the pressure sidewall 60. The one or more interior walls 62 may extend spanwise from the base end 52A of the airfoil 52 to the tip end 52B of the airfoil 52. In the example diagrammatically shown in FIG. 5, the airfoil 52 includes a first interior wall 62A, a second interior wall 62B, a third interior wall 62C, a fourth interior wall 62D, and a fifth interior wall 62E. The airfoil includes a plurality of interior cavities 64. At the leading edge 54, the suction sidewall 58, the pressure sidewall 60, and the first interior wall 62A define a leading edge cavity 64A. Adjacent the leading edge cavity 64A, the suction sidewall 58, the pressure sidewall 60, the first interior wall 62A, and the second interior wall 62B define a first intermediate cavity 64B. Adjacent the first intermediate cavity 64B, the suction sidewall 58, the pressure sidewall 60, the second interior wall 62B, and the third interior wall 62C define a second intermediate cavity 64C. Adjacent the second intermediate cavity 64C, the suction sidewall 58, the pressure sidewall 60, the third interior wall 62C, and the fourth interior wall 62D define a third intermediate cavity 64D. Adjacent the third intermediate cavity 64D, the suction sidewall 58, the pressure sidewall 60, the fourth interior wall 62D, and the fifth interior wall 62E define a fourth intermediate cavity 64E. Adjacent the fourth intermediate cavity 64E, the suction sidewall 58, the pressure sidewall 60, and the fifth interior wall 62E define a trailing edge cavity 64F. The sectional view shown in FIG. 6 illustrates the interior cavities 64 extending spanwise between the base end 52A and the tip end 52B of the airfoil 52. The present disclosure is not limited to the example airfoil 52 configuration shown in FIGS. 5 and 6.

In some embodiments, an airfoil 52 according to the present disclosure may include a plurality of pedestals (not shown) that extend inwardly from the respective sidewall within an interior cavity 64; e.g., from the suction sidewall 58 toward the pressure sidewall 60, and from the pressure sidewall 60 toward the suction sidewall 58. The pedestals may be configured to locate a baffle and to create sub-cavities.

At least one of the interior cavities 64 is in fluid communication with the outer plenum 66 disposed radially outside of the vane 46; e.g., a fluid passage extends through the outer radial platform 50. In some embodiments, an interior cavity 64 is in fluid communication with the inner plenum 68 disposed radially inside of the vane 46; e.g., a fluid passage extends through the inner radial platform 48. FIG. 6 shows the first, second, third, and fourth intermediate cavities 64B, 64C, 64D, 64E in fluid communication with the outer plenum 66. The first, second, and third intermediate cavities 64B, 64C, 64D are shown in fluid communication with the inner plenum 68. In contrast, the leading edge cavity 64A and the trailing edge cavity 64F are not in direct fluid communication with either the outer plenum 66 or the inner plenum 68. The fourth intermediate cavity 64E is not in direct fluid communication with the inner plenum 68. In some embodiments, apertures may be disposed in an interior wall to allow the passage of air between that intermediate cavity and an adjacent cavity. For example, apertures 70 may be disposed in the first interior wall 62A to permit air to pass between the first intermediate cavity 64B and the leading edge cavity 64A, and apertures 72 may be disposed in the fifth interior wall 62E to permit air to pass between the fourth intermediate cavity 64E and the trailing edge cavity 64F. A plurality of apertures 75 (e.g., see FIGS. 6 and 15) may be disposed at the trailing edge 56 to allow air to exit the trailing edge cavity 64F to the exterior of the airfoil 52.

Embodiments of the present disclosure include at least one baffle 74 disposed within an interior cavity 64 of the vane 46. The vane 46 embodiment shown in FIG. 5 illustrates a baffle 74 disposed within the fourth intermediate cavity 64E.

Figure 8:
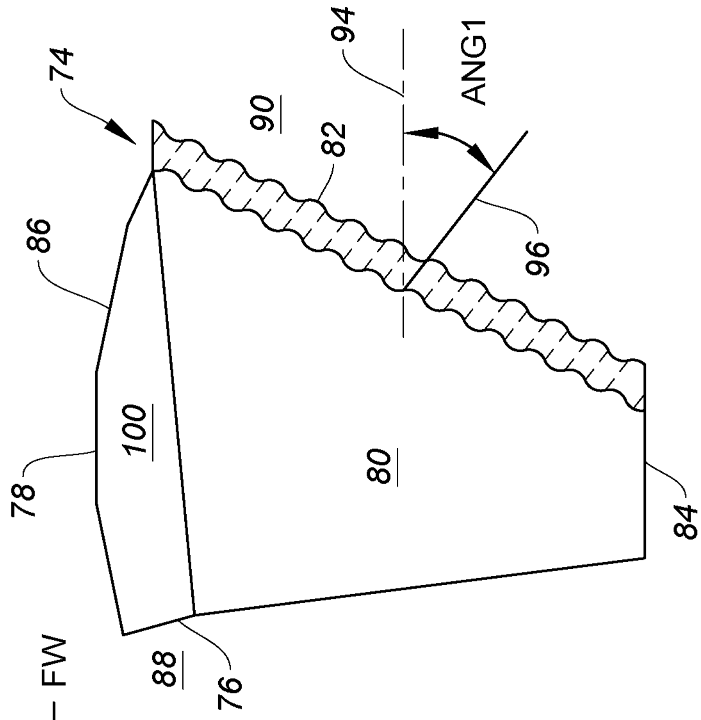
FIG. 8 is a diagrammatic view of a present disclosure baffle embodiment.
Figure 7:
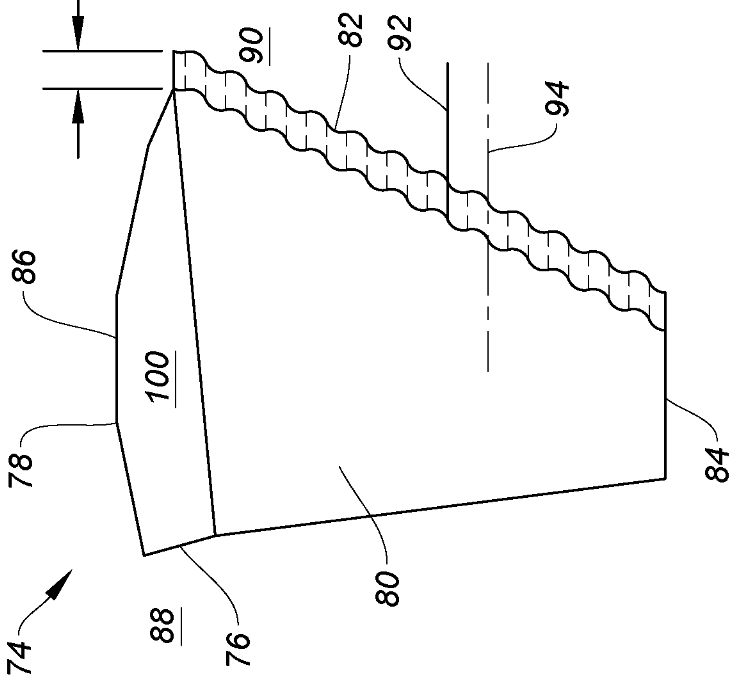
FIG. 7 is a diagrammatic view of a present disclosure baffle embodiment.

Referring to FIGS. 5, 7, and 8, the baffle 74 includes a forward wall segment 76, a suction sidewall segment 78, a pressure sidewall segment 80, and a fin segment 82. Each of the baffle wall segments 76, 78, 80, 82 may be formed from a sheet metal material. Each of the wall segments 76, 78, 80, 82 extends radially between an inner radial edge 84 and an outer radial edge 86. The forward wall segment 76 is disposed at a forward end 88 of the baffle 74 and extends between the suction sidewall segment 78 and the pressure sidewall segment 80. The suction sidewall segment 78 and the pressure sidewall segment 80 are engaged with one another at the aft end 90 of the baffle 74. The forward wall segment 76, suction sidewall segment 78, and the pressure sidewall segment 80 are collectively configured to substantially mirror the contour of airfoil interior cavity 64 in which the baffle 74 is disposed. The baffle 74 configuration diagrammatically shown in FIGS. 7 and 8 has a generally triangular configuration that mirrors the contour of the fourth intermediate cavity 64E of the airfoil 52; e.g., the suction sidewall segment 78 and the pressure sidewall segment 80 decreasingly taper from the outer radial edge 86 towards the inner radial edge 84. Although not shown in FIGS. 7 and 8, the baffle 74 may also taper laterally between the outer radial edge 86 and the inner radial edge 84 (i.e., the lateral distance between the suction sidewall segment 78 and the pressure sidewall segment 80 decreases) if the airfoil interior cavity 64 is so configured.

The fin segment 82 extends outwardly from the baffle 74 (i.e., the baffle interior chamber 100) at the aft end 90 of the baffle 74. In the embodiment shown in FIG. 5, the fin segment 82 extends outwardly from the point of engagement between the suction and pressure sidewall segments 78, 80 toward the fifth interior wall 62E. Referring to FIG. 7, the fin segment 82 may extend radially/lengthwise the entire distance between the inner radial edge 84 and the outer radial edge 86 but that is not required. The fin segment 82 extends outwardly a distance ("FW") that may be referred to as the width of the fin segment 82. In the baffle 74 embodiment shown in FIGS. 7 and 8, the width of the fin segment 82 is uniform along the length of the fin segment 82 between the inner radial edge 84 and the outer radial edge 86. In some embodiments, the width of the fin segment 82 may vary along the length of the fin segment 82 between the inner radial edge 84 and the outer radial edge 86. For example in FIG. 12, a baffle 74 embodiment is shown that has a fin segment width at the outer radial edge 86 (FWOR) that is less than the fin segment width at the inner radial edge 84 (FWIR; FWOR<FWIR). In the baffle 74 embodiment shown in FIG. 13, the fin segment width at the outer radial edge 86 (FWOR) is greater than the fin segment width at the inner radial edge 84 (FWIR; FWOR>FWIR).

Figure 9:
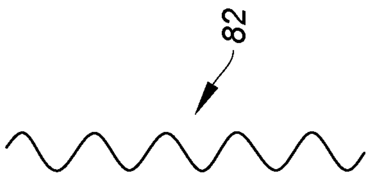
FIG. 9 is a diagrammatic illustration of a present disclosure fin wavy configuration.

As will be detailed herein, the fin segment 82 is configured to cause cooling air flow that engages with the fin segment 82 to become turbulent or increase its degree of turbulence. In some embodiments, the fin segment 82 may have a non-planar configuration that may be described as wavy, sinusoidal, periodic, or the like (collectively referred to hereinafter as "wavy" to facilitate the description herein). FIG. 9 illustrates an example of a fin segment 82 wavy configuration. The present disclosure is not limited to this example.

Figure 17A:
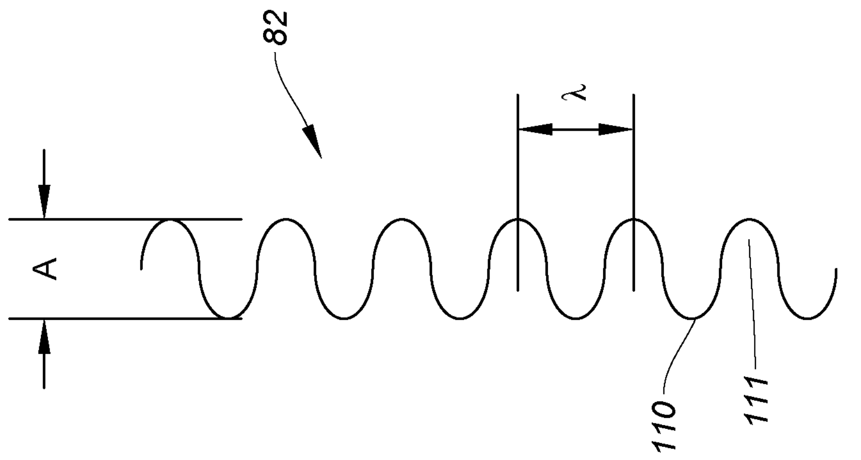
FIG. 17A is a diagrammatic end view of the baffle embodiment shown in FIG. 17.
Figure 17:
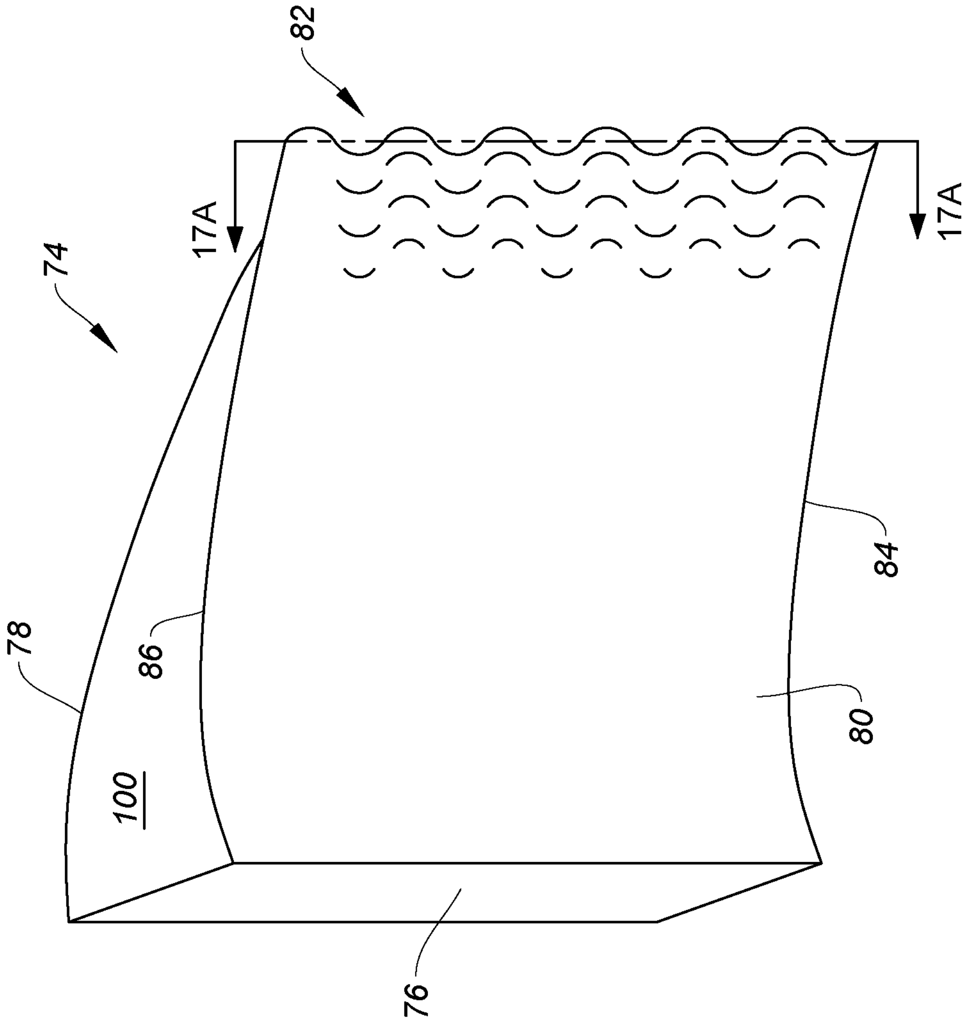
FIG. 17 is a diagrammatic view of a present disclosure baffle embodiment.

FIG. 17 is another diagrammatic view of a fin segment 82 that extends outwardly from the baffle 74. As can be seen from the perspective arrows 17A-17A shown in FIG. 17, FIG. 17A is an end view of the baffle 74 to facilitate explanation of the fin segment 82 geometry. In the embodiment shown in FIGS. 17 and 17A, the fin segment 82 has a periodic configuration that has an amplitude "A" and a frequency "2". The periodic configuration may be described as having alternating waves and furrows. In this example, the amplitude and the frequency of the waves 110 and furrows 111 are constant along the length of the fin segment 82 between the inner radial edge 84 and the outer radial edge 86. The amplitude and the frequency of the waves 110 and furrows 111 may be selected for the application at hand.

Figure 18A:
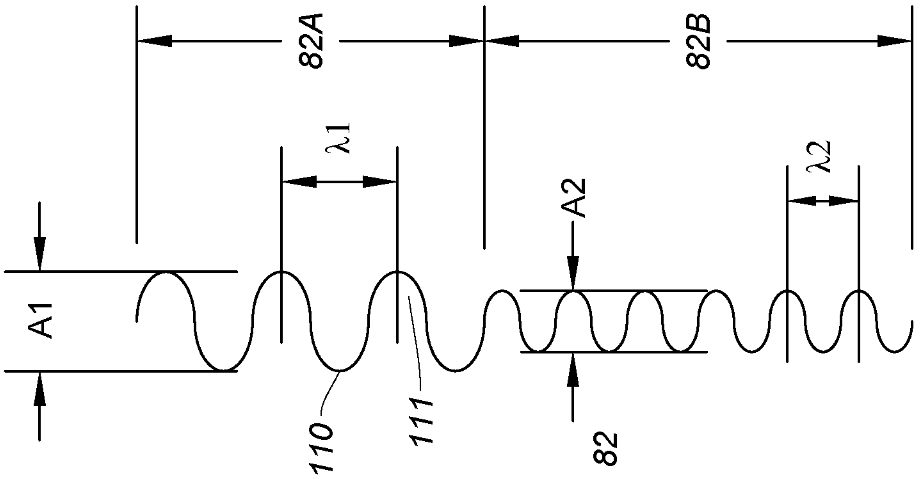
FIG. 18A is a diagrammatic end view of the baffle embodiment shown in FIG. 18.
Figure 18:
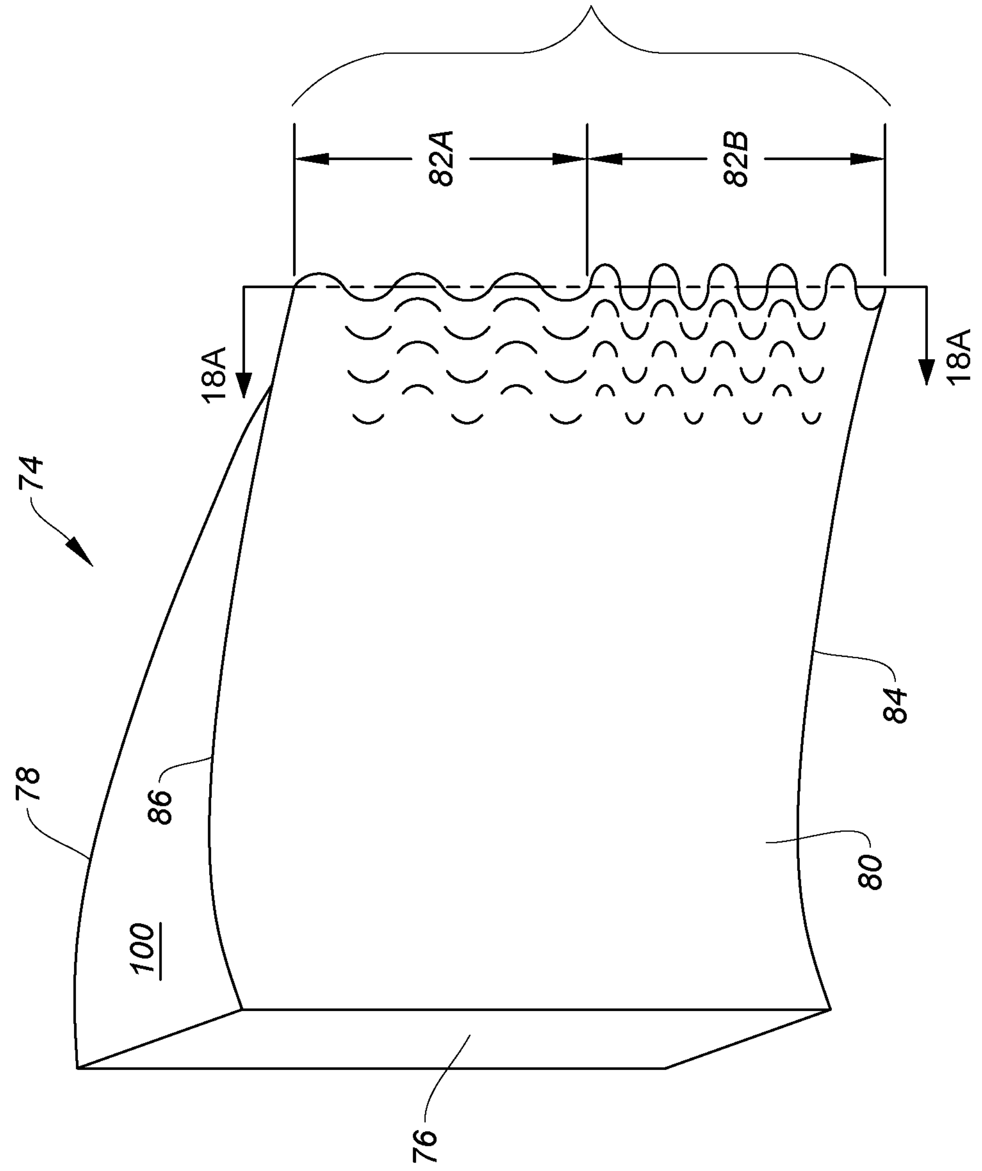
FIG. 18 is a diagrammatic view of a present disclosure baffle embodiment.
Figures 19A, 19B, 19C, 19D, 19E, 19F:
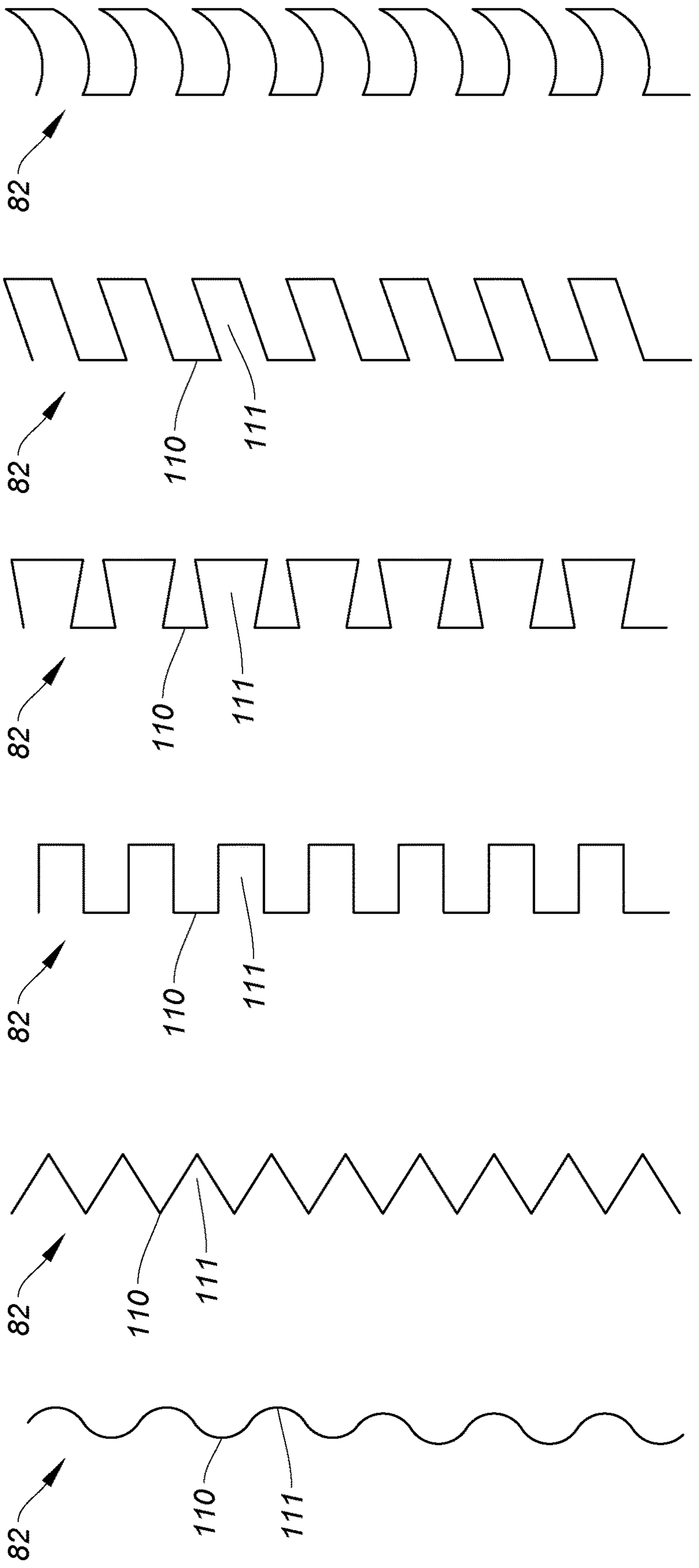
FIGS. 19A-19F diagrammatically illustrates examples of fin segment embodiments.

FIG. 18 is another diagrammatic view of a fin segment 82 that extends outwardly from the baffle 74. As can be seen from the perspective arrows 18A-18A shown in FIG. 18, FIG. 18A is an end view of the baffle 74 to facilitate explanation of the fin segment 82 geometry. In the embodiment shown in FIGS. 18 and 18A, the fin segment 82 has a periodic configuration in a first fin segment portion 82A that has a first amplitude "A1" and a first frequency "λ1", and has a periodic configuration in a second fin segment portion 82B that has a second amplitude "A2" and a second frequency "λ2". In this example, the first amplitude is greater than the second amplitude (i.e., A1>A2), and the first frequency is lower than the second frequency (i.e., λ1<λ2). It is not required, however, that both the amplitudes and the frequencies be different. The example embodiment shown in FIG. 18 is provided to illustrate that the fin segment 82 may have more than one periodic configuration along the length of the fin segment 82 between the inner radial edge 84 and the outer radial edge 86; e.g., two or more periodic configurations.

FIGS. 19A-19F are provided to illustrate examples of periodic configurations that a fin segment 82 may include. The periodic configuration examples shown in FIGS. 19A-19F are provided to illustrate possible configurations and the present disclosure is not limited to these examples. The periodic configuration illustrated in FIG. 19A may be described as sinusoidal pattern having waves 110 and furrows 111. The periodic configuration illustrated in FIG. 19B may be described as a zigzag or triangle pattern. The periodic configuration illustrated in FIG. 19C may be described as a square or rectangular tooth pattern. The periodic configuration illustrated in FIG. 19D may be described as a trapezoidal tooth pattern. The periodic configuration illustrated in FIG. 19E may be described as a canted square or rectangular tooth pattern. The periodic configuration illustrated in FIG. 19F may be described as a canted arcuate tooth pattern. As indicated herein, the present disclosure is not limited to the periodic configurations shown in FIGS. 19A-19F.

Figure 10:
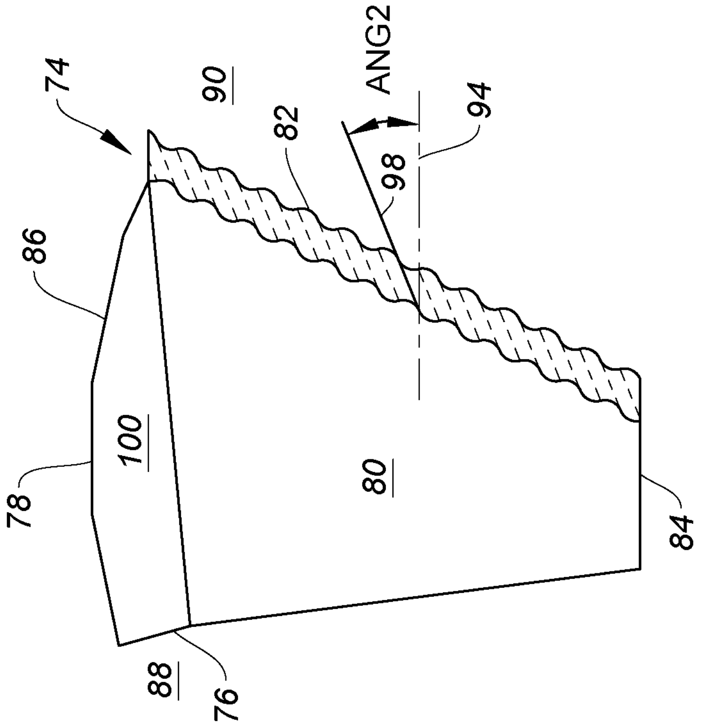
FIG. 10 is a diagrammatic view of a present disclosure baffle embodiment.
Figure 22:
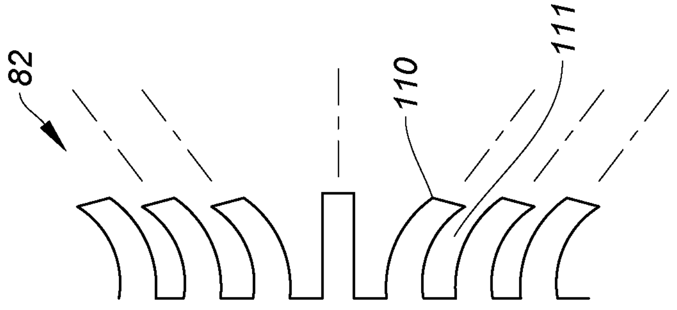
FIG. 22 is a diagrammatic view of a fin segment embodiment.
Figure 21:
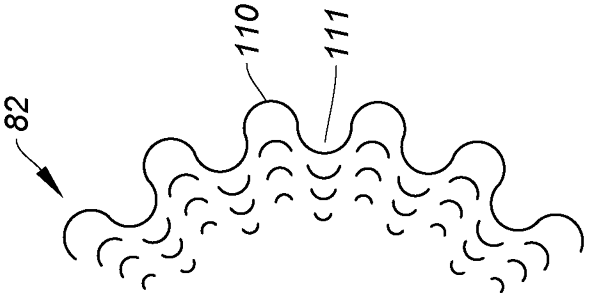
FIG. 21 is an enlarged view of a portion of the baffle embodiment shown in FIG. 20.
Figure 20A:
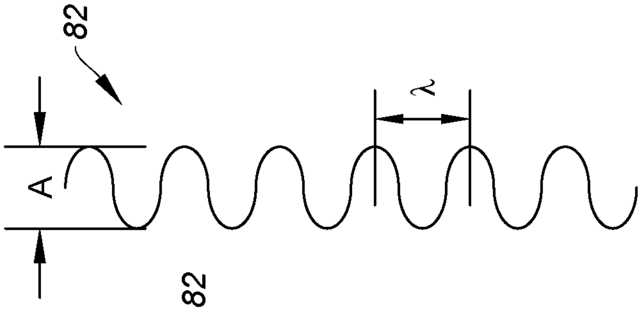
FIG. 20A is a diagrammatic end view of the baffle embodiment shown in FIG. 20.
Figure 20:
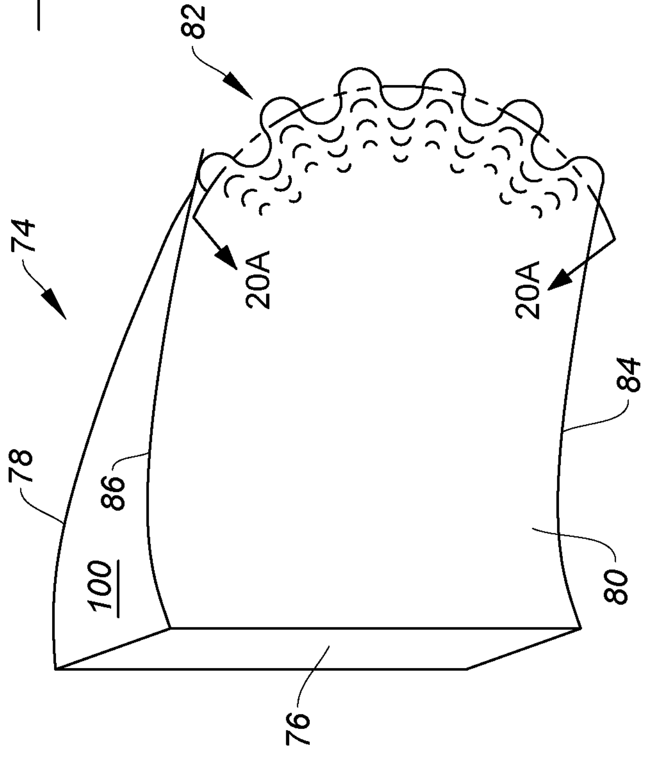
FIG. 20 is a diagrammatic view of a present disclosure baffle embodiment.

FIG. 20 is another diagrammatic view of a fin segment 82 that extends outwardly from the baffle 74. In this embodiment, the fin segment 82 extends along an arcuate line; e.g., the fin segment may be described as having a "bowed" configuration that extends along the view line 20A-20A shown in FIG. 20, wherein the lengthwise central portion of the fin segment 82 is disposed closed to the trailing edge 56 of the vane 46 (e.g., see FIG. 5) than either lengthwise end of the fin segment 82. In this example, the fin segment 82 has a periodic configuration having an amplitude "A" and a frequency "λ" as can be seen in FIG. 20A. As stated herein, however, the present disclosure is not limited to any particular periodic configuration. FIG. 21 is an enlargement of the fin segment 82 shown in FIG. 18. FIG. 22 illustrates a fin segment 82 configuration in which some elements (e.g., waves 110 and furrows 111) of a fin segment 82 may be configured to direct cooling air in a first direction (e.g., at an outer radial angle) and some elements of a fin segment 82 may be configured to direct cooling air in a second direction; e.g., at an inner radial angle. The embodiments shown in FIGS. 7, 8, and 10 also illustrate waves disposed at different angles. The present disclosure contemplates any combination of waves and furrows and any combination of wave/furrow angles. In some embodiments, the combination of fin segment features may be non-uniform along the length of the fin segment 82 to create desirable cooling air distribution within the vane.

In those baffle 74 embodiments having a fin segment 82 with a wavy configuration, the orientation of the wavy configuration may vary to suit the application. The fin segment 82 embodiment shown in FIG. 7 has waves that extend along an axis (indicated by line 92) that extends in a direction that is substantially parallel to the central axis 28 (indicated by line 94). These waves may be described as having an axial orientation. The fin segment 82 embodiment shown in FIG. 8 has waves that extend along an axis (indicated by line 96) that extends in a direction that is skewed by a radially inward angle "ANG1" relative to the central axis 28 (indicated by line 94). The fin segment 82 embodiment shown in FIG. 10 has waves that extend along an axis (indicated by line 98) that extends in a direction that is skewed by a radially outward angle "ANG2" relative to the central axis 28 (indicated by line 94). In some embodiments, wavy features may vary in different lengthwise regions; e.g., a first lengthwise region that has wavy features disposed at a radially inward angle "ANG1", a second lengthwise region that has wavy features disposed at a radially outward angle "ANG2", and so on. The characteristics of the wavy configuration (e.g., period, amplitude, and so on) may also be varied to suit an application.

Figure 11:
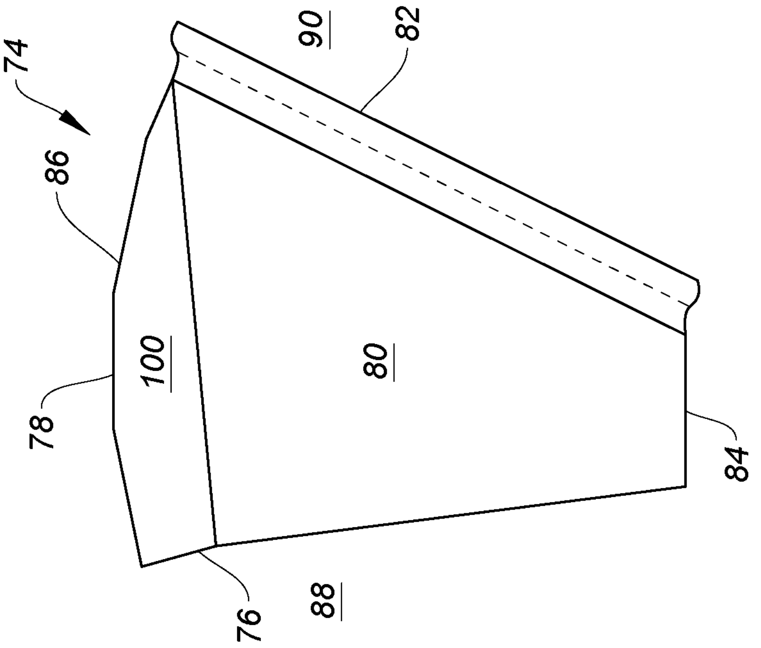
FIG. 11 is a diagrammatic view of a present disclosure baffle embodiment.
Figure 13:
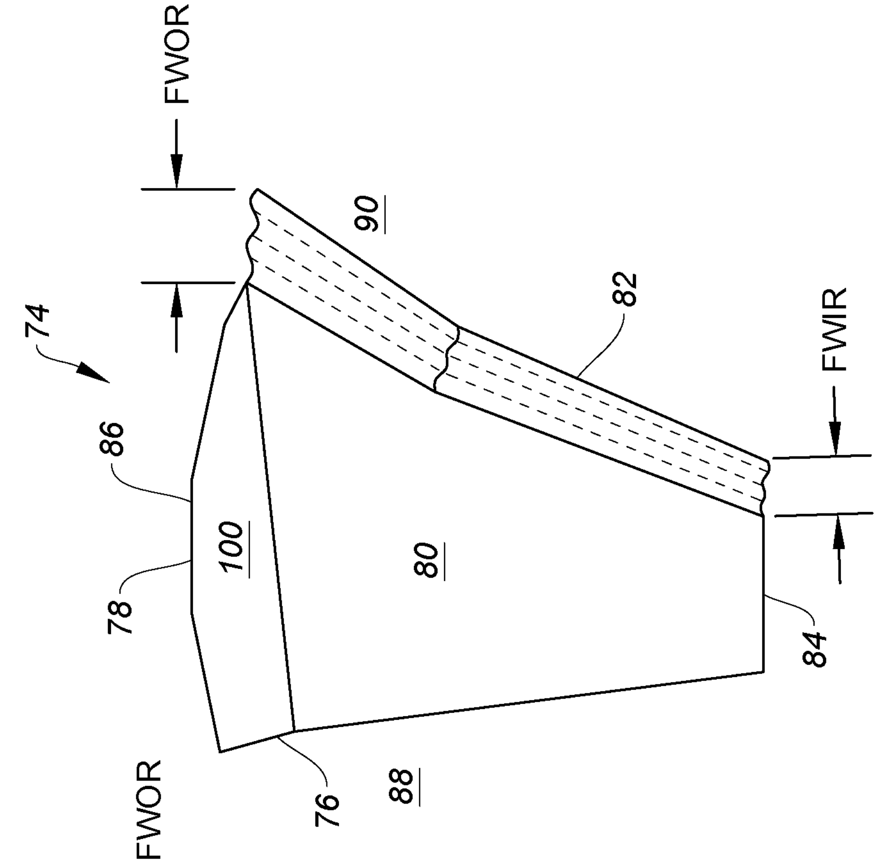
FIG. 13 is a diagrammatic view of a present disclosure baffle embodiment.
Figure 12:
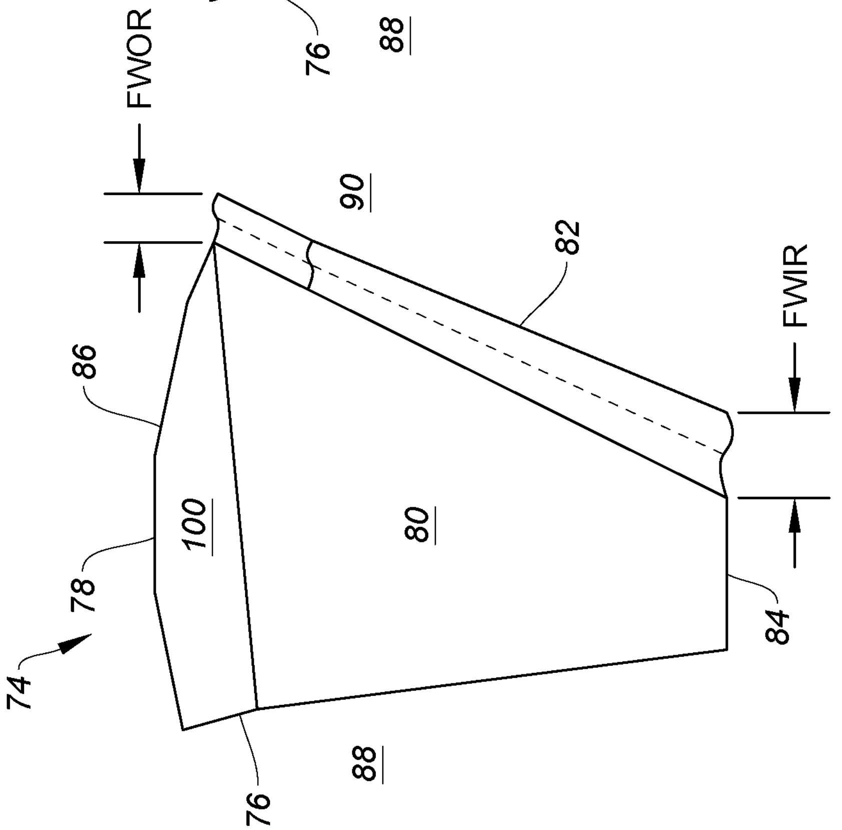
FIG. 12 is a diagrammatic view of a present disclosure baffle embodiment.

Referring to FIGS. 11-13, in some embodiments, the fin segment 82 may have a wavy configuration having an axis that extends along the aft end 90 of the baffle 74 between the inner radial edge 84 and the outer radial edge 86. In FIG. 11, for example, the fin segment 82 has a wavy configuration that extends substantially parallel to the aft end 90 of the baffle 74 between the inner radial edge 84 and the outer radial edge 86. FIGS. 12 and 13 illustrate fin segments 82 having a wavy configuration that extends along an axis that is slightly skewed relative to the aft end 90 of the baffle 74 as a result of the width of the baffle 74 varying between the inner radial edge 84 and the outer radial edge 86. As stated above, the characteristics of the wavy configuration (e.g., period, amplitude, and so on) may also be varied to suit an application; e.g., the wavy configuration shown in FIGS. 11 and 12 illustrate a wave extending along a single period, and the wavy configuration shown in FIG. 13 illustrate a wave extending along a plurality of periods.

In some embodiments, the baffle 74 may be a unitary body; e.g., formed as a single body. In other embodiments, the baffle 74 may be assembled from a plurality of members. For example, the forward wall segment 76 and the pressure sidewall segment 80 in the baffle 74 shown in FIGS. 7 and 8 may be a first member, and the suction sidewall segment 78 and the fin segment 82 may be a second member. In this example, the first member and the second member may be joined (e.g., by weldment) at the interface between the suction sidewall segment 78 and the forward wall segment 76, and joined at the interface between the pressure sidewall segment 80 and the suction sidewall segment 78. The present disclosure is not limited to this example. The forward wall segment 76, suction sidewall segment 78, and the pressure sidewall segment 80 collectively define an interior chamber 100 of the baffle 74.

Figure 14:
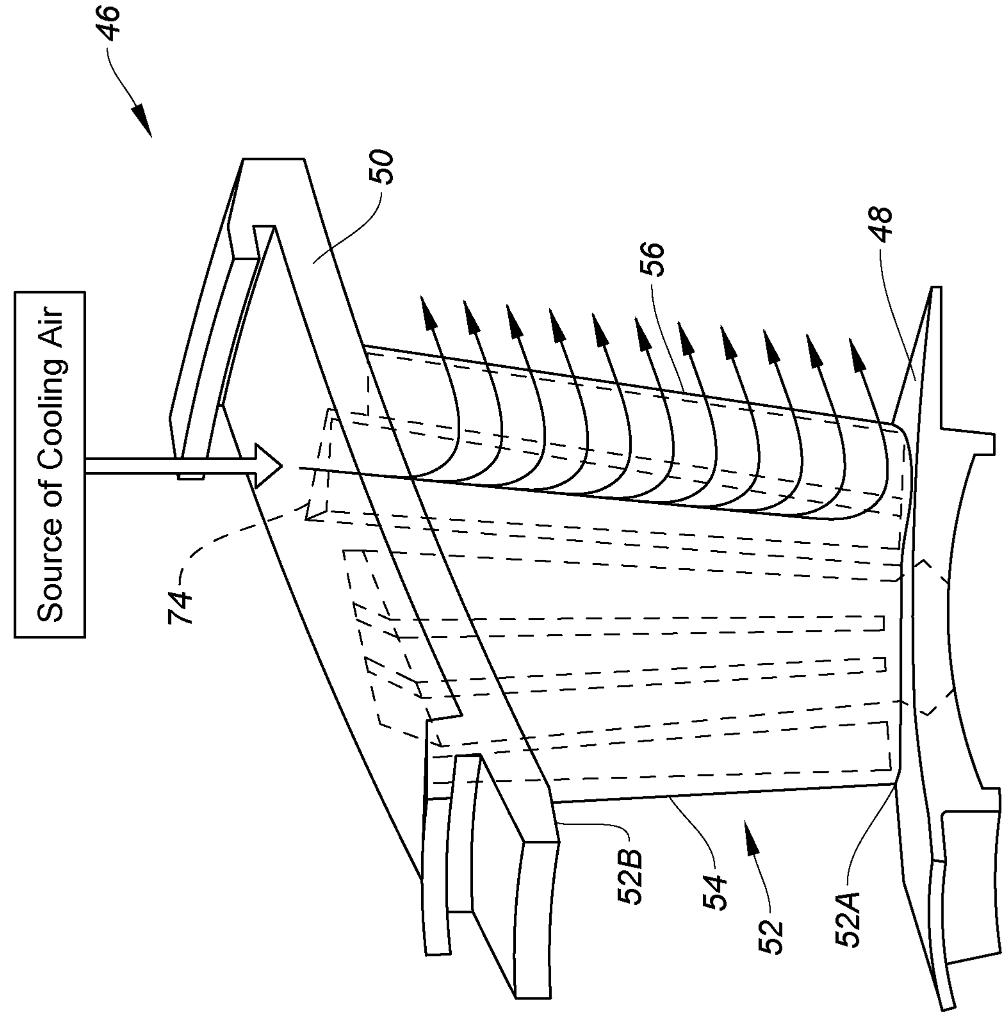
FIG. 14 is a diagrammatic view of a turbine vane structure, illustrating cooling air flow.

FIG. 14 diagrammatically illustrates cooling air from a source of cooling air being provided to the vane 46. Specifically, in this example the cooling air is being provided into the fourth intermediate cavity 64E of the vane 46 through one or more fluid passages that extend through the outer radial platform 50. As shown diagrammatically, the cooling air travels radially within the fourth intermediate cavity 64E from the outer radial edge 86 toward the inner radial edge 84. A long the way, portions of the cooling airflow redirect in a chordwise direction into the trailing edge cavity 64F whereafter the cooling air escapes the vane 46; e.g., via apertures 72 disposed at the trailing edge 56.

Figure 15:
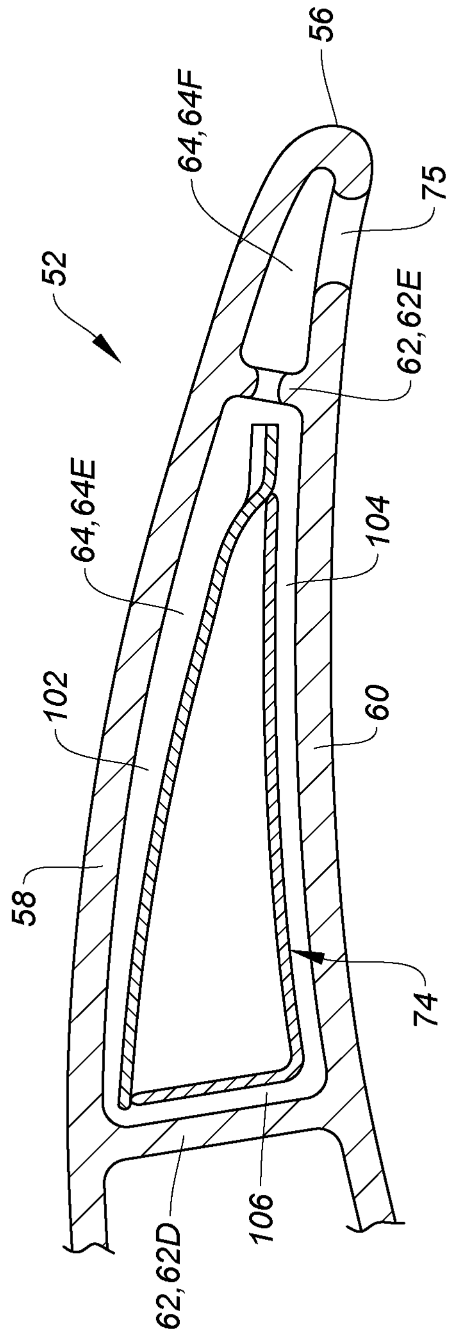
FIG. 15 is a diagrammatic sectional view of a turbine vane airfoil with a present disclosure baffle embodiment.

Referring to FIG. 15, the configuration of the baffle wall segments 76, 78, 80, is such that a suction side passage 102 is formed between the interior surface of the suction sidewall 58 and the suction sidewall segment 78, and a pressure side passage 104 is formed between the interior surface of the pressure sidewall 60 and the pressure sidewall segment 80. In some embodiments (like that shown in FIG. 14), the baffle 74 may be configured so that a forward side passage 106 is formed between the forward wall segment 76 and the aft surface of the fourth interior wall 62D. At least some of the cooling air traveling radially within the fourth intermediate cavity 64E, passes within the suction side passage 102 and the pressure side passage 104. In FIG. 15, cooling air flow traveling radially within the fourth intermediate cavity 64E from the outer radial edge 86 toward the inner radial edge 84 would be perpendicular to the plane of the FIGURE.

Figure 16:
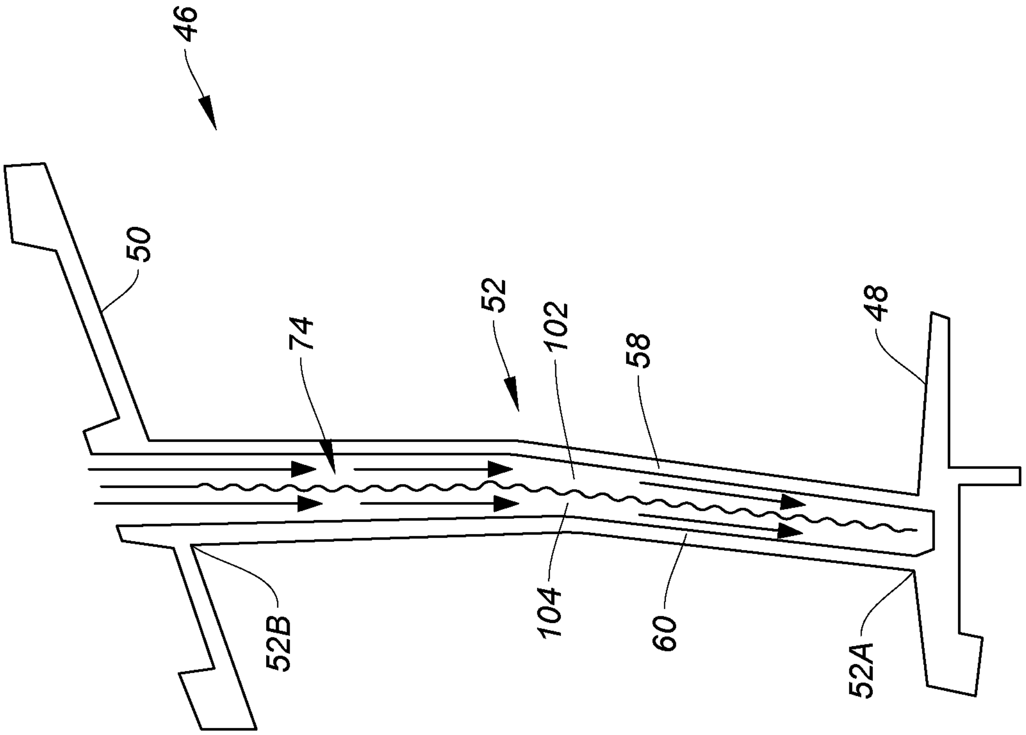
FIG. 16 is a diagrammatic view taken from the perspective of the section line 16-16 shown in FIG. 5.

As indicated above, portions of the cooling airflow passing radially within the suction side passage 102 and the pressure side passage 104 redirect in a chordwise direction toward the fifth interior wall 62E that separates the fourth intermediate cavity 64E from the trailing edge cavity 64F. The cooling air flow passing through the fourth intermediate cavity 64E engages with the fin segment 82 of the present disclosure baffle 74. The fin segment 82 configuration (e.g., the wavy configuration) produces turbulence and or increases the level of existing turbulence within the cooling air flow. The turbulence is understood to appreciably increase convective cooling. FIG. 16 is a diagrammatic view taken from the perspective of the section line 16-16 shown in FIG. 5, illustrating the cooling air flow within the suction side passage 102 and the pressure side passage 104, engaging with the fin segment 82.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A turbine vane, comprising:
an outer radial platform;
an inner radial platform;
an airfoil extending radially between the inner radial platform and the outer radial platform, wherein the airfoil extends spanwise between a base end and a tip end, and extends chordwise between a leading edge and a trailing edge, and wherein the airfoil includes a suction sidewall and a pressure sidewall laterally opposite the suction sidewall, and an interior wall that extends laterally between the suction sidewall and the pressure sidewall, wherein the pressure sidewall, the suction sidewall, and the interior wall define an interior cavity; and
a baffle disposed in the interior cavity, the baffle including a forward wall segment, a suction sidewall segment, a pressure sidewall segment, and a fin segment, wherein the forward wall segment, the suction sidewall segment, and the pressure sidewall segment collectively define an interior chamber of the baffle, and wherein the fin segment extends outwardly from the interior chamber, and wherein the fin segment has a wavy configuration;
wherein the baffle extends lengthwise between an inner radial edge and an outer radial edge, the fin segment extends in a direction between the inner radial edge and the outer radial edge, and the fin segment has a width that varies between the inner radial edge and the outer radial edge.

2. The turbine vane of claim 1, the suction sidewall segment and the pressure sidewall segment are engaged with one another at a point of engagement and the fin segment extends outwardly from the point of engagement.

3. The turbine vane of claim 2, wherein the forward wall segment and the pressure sidewall segment are integral with one another, and the suction sidewall segment and the fin segment are integral with one another; and
wherein the forward wall segment is attached to the suction sidewall segment, and the pressure sidewall segment is attached to the suction sidewall segment at the point of engagement.

4. The turbine vane of claim 3, wherein the forward wall segment is disposed at a forward end of the baffle and the fin segment is disposed at an aft end of the baffle, and the wavy configuration of the fin segment includes a plurality of waves that each extend along a wave axis that extends in an aft direction.

5. The turbine vane of claim 4, wherein the wave axis of the plurality of waves has an axial orientation.

6. The turbine vane of claim 4, wherein the wave axis of the plurality of waves is disposed at a radially outward angle.

7. The turbine vane of claim 4, wherein the wave axis of the plurality of waves is disposed at a radially inward angle.

8. The turbine vane of claim 4, wherein the wavy configuration of the fin segment has at least one wave that extends along a wave axis that extends parallel to the point of engagement.

9. The turbine vane of claim 1,
wherein the fin segment has a first width at the inner radial edge and a second width at the outer radial edge, wherein the first width is greater than the second width.

10. The turbine vane of claim 1,
wherein the fin segment has a first width at the inner radial edge and a second width at the outer radial edge, wherein the second width is greater than the first width.

11. The turbine vane of claim 1, wherein the wavy configuration is periodic and has an amplitude and a frequency.

12. The turbine vane of claim 1, wherein the wavy configuration includes a first wavy portion that is periodic and has a first amplitude and a first frequency, and includes a second wavy portion that is periodic and has a second amplitude and a second frequency; and
wherein the first amplitude is greater than the second amplitude.

13. A gas turbine engine, comprising:
a compressor section;
a combustor section; and
a turbine section that includes an annular vane stage having a plurality of vanes that collectively form the annular vane stage, wherein the turbine section includes at least one rotor stage rotatable about a central axis;
wherein each vane of the plurality of vanes includes:
an outer radial platform;
an inner radial platform;
an airfoil extending radially between the inner radial platform and the outer radial platform, wherein the airfoil extends spanwise between a base end and a tip end, and extends chordwise between a leading edge and a trailing edge, and wherein the airfoil includes a suction sidewall and a pressure sidewall laterally opposite the suction sidewall, and an interior wall that extends laterally between the suction sidewall and the pressure sidewall, wherein the pressure sidewall, the suction sidewall, and the interior wall define an interior cavity; and
a baffle disposed in the interior cavity, the baffle including a forward wall segment, a suction sidewall segment, a pressure sidewall segment, and a fin segment, wherein the forward wall segment, the suction sidewall segment, and the pressure sidewall segment collectively define an interior chamber of the baffle, and wherein the fin segment extends outwardly from the interior chamber, and wherein the fin segment has a wavy configuration comprising a plurality of waves, each wave of the plurality of waves extending along a respective wave axis that has an axial orientation relative to the central axis.

14. The gas turbine engine of claim 13, wherein the forward wall segment and the pressure sidewall segment of the baffle are integral with one another, and the suction sidewall segment and the fin segment of the baffle are integral with one another, and wherein the suction sidewall segment and the pressure sidewall segment are engaged with one another at a point of engagement and the fin segment extends outwardly from the point of engagement.

15. The gas turbine engine of claim 14, wherein each vane of the plurality of vanes is configured to receive a flow of cooling air at the outer radial platform and direct the flow of cooling air through the vane;

wherein the wavy configuration of the fin segment is configured to produce turbulence within the flow of cooling air.

16. The gas turbine engine of claim 13, wherein the forward wall segment is disposed at a forward end of the baffle and the fin segment is disposed at an aft end of the baffle, and the wave axis extends parallel to the central axis.

17. The gas turbine engine of claim 13, wherein the forward wall segment is disposed at a forward end of the baffle and the fin segment is disposed at an aft end of the baffle, and the wave axis extends at an acute angle relative to the central axis.

18. The gas turbine engine of claim 13, wherein the suction sidewall segment and the pressure sidewall segment are engaged with one another at a point of engagement and the fin segment extends outwardly from the point of engagement.

19. The gas turbine engine of claim 13, wherein the baffle extends lengthwise between an inner radial edge and an outer radial edge, the fin segment extends in a direction between the inner radial edge and the outer radial edge, and the fin segment has a width that varies between the inner radial edge and the outer radial edge.

20. The gas turbine engine of claim 19, wherein the fin segment has a first width at the inner radial edge and a second width at the outer radial edge, wherein the first width is different than the second width.

* * * * *